(12) United States Patent
Kupfernagel et al.

(10) Patent No.: US 11,056,091 B2
(45) Date of Patent: Jul. 6, 2021

(54) DAMPING DEVICE FOR AN EXTERIOR PART, ARRANGEMENT HAVING A DAMPING DEVICE, AND MOTOR VEHICLE

(71) Applicant: VALEO Schalter und Sensoren GmbH, Bietigheim-Bissingen (DE)

(72) Inventors: Uwe Kupfernagel, Bietigheim-Bissingen (DE); Michael Hallek, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 584 days.

(21) Appl. No.: 15/763,476

(22) PCT Filed: Sep. 13, 2016

(86) PCT No.: PCT/EP2016/071492
§ 371 (c)(1),
(2) Date: Mar. 27, 2018

(87) PCT Pub. No.: WO2017/055071
PCT Pub. Date: Apr. 6, 2017

(65) Prior Publication Data
US 2018/0308464 A1    Oct. 25, 2018

(30) Foreign Application Priority Data
Sep. 29, 2015    (DE) ...................... 10 2015 116 442.6

(51) Int. Cl.
*G10K 11/168*    (2006.01)
*G01S 15/931*    (2020.01)
(Continued)

(52) U.S. Cl.
CPC ............ *G10K 11/168* (2013.01); *G01S 7/521* (2013.01); *G01S 15/931* (2013.01);
(Continued)

(58) Field of Classification Search
CPC .... G10K 11/168; G10K 11/002; G01S 7/521; G01S 15/931; G01S 2015/937; G01S 2015/938
See application file for complete search history.

(56) References Cited

U.S. PATENT DOCUMENTS 5,025,666 A * 6/1991 Kobayashi ............ B06B 1/0674
310/327
8,125,321 B2 * 2/2012 Kojima .................. G10K 9/122
340/435

(Continued)

FOREIGN PATENT DOCUMENTS

DE    10 2007 045809 A1    6/2008
DE    10 2010 023072 A1    12/2011
(Continued)

OTHER PUBLICATIONS

International Search Report issued in PCT/EP2016/071492 dated Dec. 6, 2016 (3 pages).
(Continued)

*Primary Examiner* — Jeremy A Luks
(74) *Attorney, Agent, or Firm* — Osha Bergman Watanabe & Burton LLP (57) ABSTRACT

The invention relates to a damping device (5) for an exterior part (3) of a motor vehicle (1) for damping oscillations of the exterior part (3) which are caused by way of an ultrasonic sensor (4) during the emitting and/or receiving of ultrasonic signals, the damping device (5) having at least two damping elements (7, 8), a first one of the damping elements (7) being configured for increasing a degree of damping of the exterior part (3) in a first temperature range (T1) of the exterior part (3) and/or in a first frequency range of the oscillations, and a second one of the damping elements (8) being configured for increasing a degree of damping of the exterior part (3) in a second temperature range (T2) of the exterior part (3), which second temperature range (T2) is different from the first temperature range (T1), and/or in a second frequency range of the oscillations, which second frequency range is different from the first frequency range. Moreover, the invention relates to an arrangement (2) having at least one (Continued)

damping device (5), and to a motor vehicle (1) having an arrangement (2).

15 Claims, 5 Drawing Sheets

(51) Int. Cl.
  *G01S 7/521* (2006.01)
  *G10K 11/00* (2006.01)

(52) U.S. Cl.
  CPC ...... *G10K 11/002* (2013.01); *G01S 2015/937* (2013.01); *G01S 2015/938* (2013.01)

(56) References Cited

U.S. PATENT DOCUMENTS

| | | | |
|---|---|---|---|
| 8,942,066 B2* | 1/2015 | Prausse | B60R 19/483 |
| | | | 367/188 |
| 9,746,449 B2* | 8/2017 | Eidel | G01N 29/32 |
| 9,880,049 B2* | 1/2018 | Petricevic | G01H 11/08 |
| 2009/0243886 A1* | 10/2009 | Eccardt | G01S 7/521 |
| | | | 340/932.2 |
| 2015/0268334 A1* | 9/2015 | Wehling | G10K 9/22 |
| | | | 310/334 |
| 2018/0180725 A1* | 6/2018 | Weidenfelder | G10K 11/004 |

FOREIGN PATENT DOCUMENTS

| | | |
|---|---|---|
| DE | 10 2012 210 522 A1 | 12/2013 |
| DE | 10 2012 014810 A1 | 1/2014 |
| DE | 10 2012 106694 A1 | 2/2014 |
| DE | 10 2012 109838 A1 | 4/2014 |
| DE | 10 2014 111 947 A1 | 2/2016 |
| EP | 3 012 654 A1 | 4/2016 |
| WO | 2016/026766 A1 | 2/2016 |

OTHER PUBLICATIONS

Written Opinion issued in PCT/EP2016/071492 dated Dec. 6, 2016 (17 pages).
German Search Report issued in Application No. 10 2015 116 442.6 created on Apr. 14, 2016 (10 pages).

* cited by examiner

DAMPING DEVICE FOR AN EXTERIOR PART, ARRANGEMENT HAVING A DAMPING DEVICE, AND MOTOR VEHICLE

The invention relates to a damping device for an exterior part of a motor vehicle for damping oscillations of the exterior part which are caused by way of an ultrasonic sensor during the emitting and/or receiving of ultrasonic signals. Moreover, the invention relates to an arrangement having a damping device, and to a motor vehicle.

It is already known from the prior art to arrange ultrasonic sensors on a motor vehicle, in order to monitor a surrounding region of the motor vehicle. Here, an ultrasonic signal is emitted by the ultrasonic sensors and the ultrasonic signal which is reflected on an object in the surrounding region is received again. Here, information about the detected object, for example a distance of the object from the motor vehicle, can be provided to a driver assistance system of the motor vehicle, for example a parking assistance system.

Moreover, it is known to arrange ultrasonic sensors of this type in a hidden or concealed manner behind exterior parts of the motor vehicle or a vehicle exterior shell, for example behind bumpers or an exterior trim panel of side doors of the motor vehicle. Here, the ultrasonic sensors are arranged on a rear side of the exterior part, which rear side faces away from the surrounding region of the motor vehicle, with the result that the ultrasonic sensors emit and/or receive the ultrasonic signals through the trim panel part. Undesired oscillations, for example solid-borne sound or vibrations, can be excited in the exterior part by way of the emitting and/or receiving of the ultrasonic signals through the exterior part. Said oscillations can produce interfering signals for adjacent ultrasonic sensors which are likewise arranged in a concealed manner on the exterior trim panel part.

In order to damp said oscillations and therefore to avoid the interfering signals, it is known from the prior art to use damping devices, for example rubber rings, on the exterior parts. It is a disadvantage in the case of the damping devices according to the prior art, however, that the damping devices are as a rule dependent on a temperature of the exterior part and a frequency of the excited oscillation, and therefore do not satisfy the requirements of complete damping of the panel oscillations over the required temperature range, in particular at frequencies in the ultrasonic range.

It is an object of the present invention to damp oscillations which are caused by ultrasonic sensors on exterior parts of motor vehicles in a particularly simple and reliable manner.

According to the invention, this object is achieved by way of a damping device, an arrangement and a motor vehicle having the features according to the independent patent claims.

A damping device according to the invention for an exterior part of a motor vehicle serves for damping oscillations of the exterior part which are caused by way of an ultrasonic sensor during the emitting and/or receiving of ultrasonic signals. The damping device has at least two damping elements, a first one of the damping elements being configured for increasing a degree of damping of the exterior part in a first temperature range of the exterior part and/or in a first frequency range of the oscillations, and a second one of the damping elements being configured for increasing a degree of damping of the exterior part in a second temperature range of the exterior part, which second temperature range is different from the first temperature range, and/or in a second frequency range of the oscillations, which second frequency range is different from the first frequency range.

The damping device which can be arranged together with the ultrasonic sensor on a rear side of the exterior part, which rear side faces away from a surrounding region of the motor vehicle, serves to attenuate or damp the oscillations which are caused by way of the ultrasonic sensor during the emitting and/or receiving of the ultrasonic signals along a transmitting direction through the exterior part. The exterior part can comprise, for example, glass, metal or a plastic and can be configured, for example, as a bumper or a side door of the motor vehicle. The oscillations which are caused by way of the ultrasonic sensor during emitting and/or receiving can be, for example, vibrations of the exterior part or solid-borne sound which propagates in the exterior part, for example in a plane perpendicularly with respect to the transmitting direction. Other ultrasonic sensors can be disrupted during transmitting and/or receiving, for example, by way of the propagation of the oscillations in the exterior part. Reflections of the oscillations in the exterior part can also disrupt the ultrasonic sensor itself during emitting and/or receiving.

In order to prevent the said disruptions, the oscillations of the exterior part are damped by way of the damping device. Here, the damping device is coupled in terms of oscillations to the exterior part; in particular, the damping device is arranged so as to bear against the rear side of the exterior part, for example is adhesively bonded to the rear side of the exterior part. In order to ensure, moreover, that the oscillations can also be damped reliably over a high temperature range of, for example, from −40° Celsius to +120° Celsius and/or a high frequency range which comprises, in particular, frequencies in the ultrasonic range, the damping device has the at least two damping elements or damping members. Here, the first damping element and the exterior part form a first oscillatory system which has a first degree of damping or a first extent of damping, and the second damping element and the exterior part form a second oscillatory system which has a second degree of damping or a second extent of damping. Here, the first extent of damping is greater in the first frequency range and/or in the first temperature range than the second extent of damping. The second extent of damping has a higher value in the second temperature range and/or in the second frequency range than the first extent of damping.

In other words, this means that the first damping element is optimized for the first temperature range and/or the first frequency range and can therefore damp oscillations of the exterior part in the first temperature range of the exterior part and/or the first frequency range of the excited oscillations in a particularly reliable, in particular complete manner, and the second damping element is optimized for the second temperature range and/or the second frequency range and can therefore damp oscillations of the exterior part in the second temperature range of the exterior part and/or the second frequency range of the excited oscillations in a particularly reliable, in particular complete manner. Each damping element is therefore assigned a temperature range and/or frequency range, in which the damping element damps the oscillations in a particularly satisfactory and reliable manner. In other words, the first damping element has a first temperature-dependent and/or frequency-dependent damping capability, and the second damping element has a second temperature-dependent and/or frequency-dependent damping capability. Here, the first damping capability of the first damping element is greater in the first temperature range and/or first frequency range than the second damping capability of the second damping element. The second damping capability of the second damping element is greater in the second temperature range and/or second frequency range than the first damping capability of the first damping element.

Here, the temperature ranges are part ranges of the overall temperature range. Thus, for example, the first temperature range can comprise temperatures of from −40° Celsius to +40° Celsius, and the second temperature range can comprise temperatures of from +40° Celsius to +120° Celsius. More than two damping elements can also be provided, each of the damping elements increasing the degree of damping for the exterior part in a temperature range and/or frequency range which are/is assigned to the damping element.

By way of the provision of the at least two damping elements, reliable and efficient damping of oscillations in the exterior part can be provided in a particularly simple way over a high temperature range and/or a high frequency range, and therefore a high operability of the ultrasonic sensor can be provided.

The first damping element preferably comprises a first material or a first substance, and the second damping element preferably comprises a second material which is different from the first material, or a second substance. This means that the damping elements comprise different materials or material mixtures. Here, the first material has, in particular, a first viscoelastic material property, and the second material has a second viscoelastic material property. The materials therefore differ, in particular, in terms of their viscoelastic material properties.

A viscoelastic material property of this type can be, for example, the dynamic modulus of elasticity which has an elastic component, what is known as the storage modulus, and a viscous component, what is known as the loss modulus. The elastic component of the dynamic modulus of elasticity represents that component of a rigidity of the material which leads to it being possible for the energy of a mechanical load to be stored by a material by way of elastic deformation and to subsequently be output again. The viscous component represents that component of the rigidity which leads to the energy of a mechanical load being converted by the material by way of plastic deformation into frictional heat. A further viscoelastic material property can be what is known as the loss factor which denotes the ratio between the viscous component, that is to say the loss modulus, and the elastic component, that is to say the storage modulus. The mechanical properties of materials, for example damping or material damping or an elasticity of the material, are usually dependent on the temperature and a loading velocity, in particular a frequency. Therefore, the said mechanical properties of the material, that is to say, for example, a damping capability of the material, can be influenced or defined by way of the selection of the material and/or by way of the adaptation of the viscoelastic material properties.

The materials can therefore be selected on the basis of their viscoelastic material properties in such a way that they are optimized for the respective associated temperature range and/or frequency range. In other words, this means that the first material is optimized, for example, to maximum vibration damping in the first temperature range and/or the first frequency range. The second material is optimized, for example, to maximum vibration damping in the second temperature range and/or the second frequency range. Therefore, a reliable damping device which can be used in a versatile manner can be provided in a particularly simple way by way of the provision of different materials or material compositions.

The first damping element preferably comprises bitumen as the first material, and the second damping element comprises butyl rubber as the second material. On account of their sound-insulating effect, bitumen and butyl rubber are particularly satisfactorily suitable for configuring the damping elements.

The damping device preferably has a continuous cut-out for arranging the ultrasonic sensor in the cut-out. The cut-out can be provided, for example, as a hole in the damping device, with the result that a front side of the ultrasonic sensor, which front side points in the transmitting direction, and a surface of the damping device are arranged, in particular, in a flush manner, and can be arranged so as to bear against the rear side of the exterior part. That oscillation-damping region of the damping device which surrounds the cut-out and comprises the damping elements is arranged so as to adjoin the ultrasonic sensor or surrounds the ultrasonic sensor, with the result that oscillations within the exterior part which propagate, for example, perpendicularly with respect to the transmitting direction in the exterior part can be damped efficiently and reliably.

According to one advantageous embodiment of the invention, the damping device is of plate-shaped configuration, the first damping element being configured by way of a first region of the plate-shaped damping device, and the second damping element being configured by way of a second region of the plate-shaped damping device. The damping device is, in particular, of one-piece configuration and comprises the at least two regions which are separated from one another and, in particular, adjoin one another. Here, each region can have a different material which is optimized in terms of the temperature and/or the frequency. Thus, for example, the first region can comprise bitumen and the second region can comprise butyl rubber. Here, the plate-shaped damping device is to be understood to mean a damping device, the thickness of which is small in comparison with its remaining geometric dimensions, for example with respect to its diameter. The plate-shaped damping device can also be deformable or flexible, and can be configured, for example, as a damping film or damping diaphragm. In this way, the damping device can be adapted to a shape of the rear side of the outer part and can be arranged, for example, so as to bear over the full area against the rear side of the exterior part. A damping device which is configured as a plate-shaped damping device is advantageously particularly low in weight and space-saving.

According to one development of the invention, an outer edge of the plate-shaped damping device is of circular configuration, which outer edge runs about a longitudinal axis which lies perpendicularly on a surface of the damping device. In other words, this means that the damping device is configured as a round, circular plate or diaphragm. The continuous cut-out which runs along the longitudinal axis which is oriented in the transmitting direction for arranging the ultrasonic sensor can be configured centrally, that is to say in the region of a centre point of the circular surface. Therefore, starting from the ultrasonic sensor or the cut-out, the outer edge is at the same spacing from the ultrasonic sensor in all directions along the rear side of the exterior part, with the result that the oscillations in the exterior part which are caused by way of the ultrasonic signals can be damped in a particularly satisfactory manner.

In one embodiment, the plate-shaped damping device has a concentric construction, the first region being configured from a longitudinal axis of the damping device, which longitudinal axis lies perpendicularly on a surface of the plate-shaped damping device, as far as a first spacing from the longitudinal axis, and the second region being configured so as to adjoin the first region from the first spacing as far as a second spacing from the longitudinal axis. Here, the first region is arranged centrally in the plate-shaped damping device, an outer boundary of the first region being arranged parallel to and at a spacing from the outer edge of the plate-shaped damping device. If, for example, the cut-out is arranged in the region of the longitudinal axis, that is to say centrally in the plate-shaped damping device, the first region is thus configured so as to adjoin the cut-out and surrounds the cut-out completely. The second region is configured so as to adjoin the first region and surrounds the first region completely. In the case of a round, plate-shaped damping device, the first region and the second region are, in particular, of annular configuration about the longitudinal axis. If the plate-shaped damping device has precisely two damping elements, that is to say two regions, an outer boundary of the second region corresponds to the outer circumference of the plate-shaped damping device. A damping device which is configured in this way can be manufactured particularly simply.

One development of the invention provides that the plate-shaped damping device has a layered construction and comprises at least two layers, the first region being configured by way of a first layer, and the second region being configured by way of a second layer which adjoins the first layer. In other words, this means that the first region extends from a surface of the plate-shaped damping device, which surface configures an upper side of the plate-shaped damping device, as far as a first spacing from the upper side. The second region extends from the first spacing as far as a second spacing from the upper side. In the case of a damping device which has precisely two regions, the second region extends from the first spacing as far as a surface of the plate-shaped damping device, which surface configures an underside of the plate-shaped damping device. The at least two layers can in each case comprise different materials, with the result that the plate-shaped damping device is configured as a material sandwich. The layers are, in particular, of identically overlapping or congruent configuration. As a result of the said layered construction, the damping device can be manufactured particularly simply and can be of space-saving configuration. Moreover, in the case of the layered construction, more than two damping elements can be provided particularly simply, by, for example, a plurality of layers or plies with respective materials which are optimized in terms of the frequency and/or the temperature being stacked on one another. The damping device can thus be adapted or extended in a particularly simple manner to a predefined overall temperature range and/or overall frequency range.

According to one refinement of the invention, the plate-shaped damping device has at least two segments which adjoin one another along a circumferential direction which runs about a longitudinal axis of the plate-shaped damping device, the first region being configured by way of a first segment, and the second region being configured by way of a second segment. In other words, this means that the plate-shaped damping device is segmented or divided along the circumferential direction. Each of the segments can be, for example, of cake slice-shaped configuration. It can be provided here that the plate-shaped damping device is divided along the circumferential direction into more than two segments, the segments, for example, comprising the first material and the second material in an alternating manner.

It can also be provided that the damping device has more than two damping elements. It can thus be the case, for example, that the damping device has a layered construction, it being possible for at least one of the layers to have the concentric construction and/or the segmented construction. A multiplicity of materials can thus be combined, each material being optimized to a predefined temperature range and/or frequency range. In this way, the damping device can be manufactured simply and rapidly in a customer-specific manner, and can be adapted, for example, to a later use location, for example to exterior temperatures which prevail there. In this way, particularly satisfactory and efficient damping of the exterior part over a high temperature range and/or a high frequency range can be ensured in a simple way.

It proves advantageous if the plate-shaped damping device comprises a reinforcing layer, the at least two damping elements being arranged on the reinforcing layer. The reinforcing layer can be configured, for example, from aluminium and can be designed, in combination with the damping elements, for absorbing shear forces and therefore for particularly efficient damping.

The plate-shaped damping device preferably comprises a thickness of at most 1 mm and/or a diameter of at most 20 cm, in particular at most 10 cm. As a result of the said low thickness and/or the low diameter, the damping device firstly has a particularly low weight, and can secondly be attached in a particularly space-saving manner on the rear side of the exterior trim panel part.

In one development of the invention, the plate-shaped damping device has an adhesive layer on a surface of the damping device for attaching to a rear side of the exterior part, which rear side faces away from a surrounding region of the motor vehicle. The damping device can be configured, for example, as a pre-punched small adhesive plate or adhesive pad or as a self-adhesive film which can be assembled individually for a client and/or the later use location of the damping device. The client, to whom the damping elements are delivered, for example, in a manner which is applied on the reinforcing layer, can attach the damping device via the adhesive layer on the rear side of the exterior part in a particularly simple and economical manner.

Moreover, the invention relates to an arrangement for a motor vehicle having at least one ultrasonic sensor, an exterior part of the motor vehicle and at least one damping device, the at least one ultrasonic sensor and the at least one damping device being arranged on a rear side of the exterior part, which rear side faces away from a surrounding region of the motor vehicle.

The ultrasonic sensor can comprise an oscillatory diaphragm which comprises a diaphragm bottom and a diaphragm circumferential wall. Here, the diaphragm bottom has a front side which points in the transmitting direction of the ultrasonic sensor which emits ultrasonic signals and a rear side which lies opposite the front side. The exterior part can be, for example, a bumper or a side door of the motor vehicle. Here, the front side of the diaphragm bottom and the upper side of the damping device can be arranged on the rear side of the exterior part, for example can be adhesively bonded to the rear side of the exterior part. The ultrasonic sensor emits the ultrasonic signals along the transmitting direction through the exterior trim panel part in the transmitting direction into a surrounding region of the motor vehicle and/or receives the ultrasonic signals which are reflected on an object in the surrounding region through the exterior part. A first oscillatory system with a first degree of damping is configured by way of the exterior part and the first damping element, and a second oscillatory system with a second degree of damping is configured by way of the exterior part and the second damping element. Here, the first degree of damping is higher in the first temperature range and/or the first frequency range than the second degree of damping, and the second degree of damping is higher in the second temperature range and/or in the second frequency range than the first degree of damping.

The damping device is preferably applied to the rear side of the exterior part by means of a spraying method and/or a metering method. In this way, the damping device can be arranged on the rear side of the exterior part in a particularly rapid and simple manner, for example by way of being sprayed on and/or by way of being spread on.

A motor vehicle according to the invention comprises an arrangement according to the invention. The motor vehicle is configured, in particular, as a passenger motor vehicle.

The preferred embodiments which are proposed in relation to the damping device according to the invention and their advantages apply correspondingly to the arrangement according to the invention and to the motor vehicle according to the invention.

Positions and orientations which arise in the case of use as intended and arrangement as intended of the damping device in the motor vehicle and in the case of an observer who then stands in front of the motor vehicle and looks in the direction of the motor vehicle are specified by way of specifications "top", "bottom", "front", "rear", "horizontal", "vertical", "inner", "outer", "circumferential direction" (U), "longitudinal axis" (L), etc.

Further features of the invention result from the claims, the figures and the description of the figures. The features and combinations of features mentioned in the description in the preceding text and the features and combinations of features which are mentioned in the description of the figures in the following text and/or are shown in the figures alone can be used not only in the respectively specified combination, but rather also in other combinations or on their own, without departing from the scope of the invention. Embodiments of the invention which are not shown and described explicitly in the figures, but rather are apparent and can be produced by way of separated combinations of features from the described embodiments are therefore also to be considered to be included and disclosed. Embodiments and combinations of features which therefore do not comprise all the features of an originally worded independent claim are also to be considered to be disclosed.

In the following text, the invention will now be described in greater detail using one preferred exemplary embodiment and with reference to the appended drawings, in which.

In the figures, identical and functionally identical elements are provided with the same reference numerals.

Figure 1:
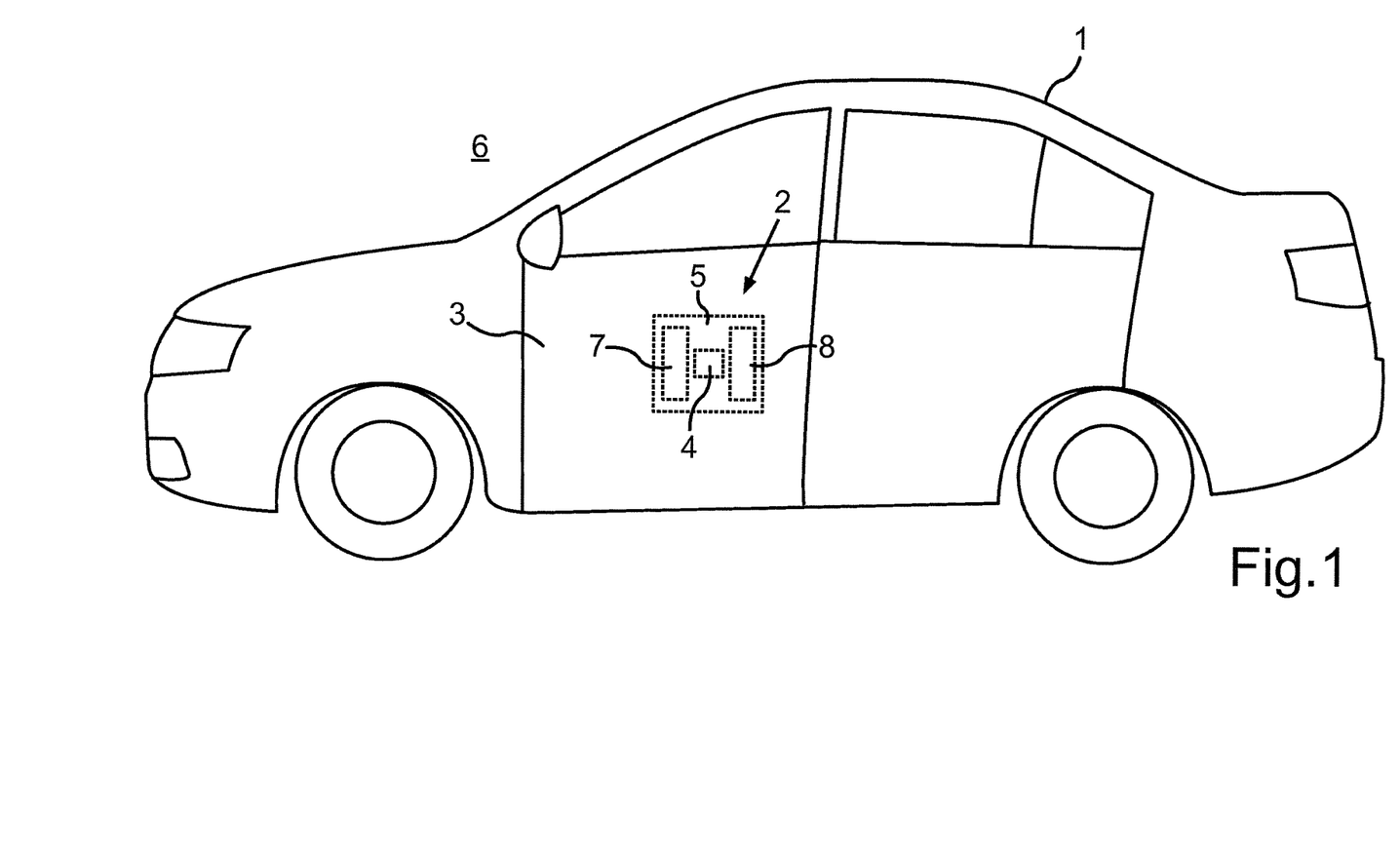
FIG. 1 shows a diagrammatic illustration of one embodiment of a motor vehicle according to the invention.

FIG. 1 shows a motor vehicle 1 according to one embodiment of the present invention. In the present case, the motor vehicle 1 is configured as a passenger motor vehicle. The motor vehicle 1 has an arrangement 2 which comprises an exterior part 3 of the motor vehicle 1, an ultrasonic sensor 4 and a damping device 5. In the present case, the exterior part 3 is configured as a side door of the motor vehicle 1. The exterior part 3 can also, however, be configured as a bumper of the motor vehicle 1, for example. The ultrasonic sensor 4 and the damping device 5 are installed on the motor vehicle 1 in a concealed manner. This means that the ultrasonic sensor 4 and the damping device 5 are arranged on a rear side of the exterior part 3, which rear side faces away from a surrounding region 6 of the motor vehicle 1.

The ultrasonic sensor 4 is designed to detect the surrounding region 6 of the motor vehicle 1. To this end, the ultrasonic sensor 4 can emit ultrasonic signals along a transmitting direction into the surrounding region 6 and/or can receive them from the surrounding region 6. As a result of the concealed installation of the ultrasonic sensor 4, the ultrasonic sensor 4 emits and/or receives the ultrasonic signals through the exterior part 3. As a result of the emitting and/or receiving of ultrasonic signals through the exterior part 3, oscillations, for example vibrations or solid-borne sound, can be excited in the exterior part 3, which oscillations can propagate over an area of the exterior part 3, in particular perpendicularly with respect to the transmitting direction.

In order to damp the said undesired oscillations in the exterior part 3, the arrangement 2 comprises the damping device 5. The damping device 5 comprises at least two damping elements 7, 8. Here, the first damping element 7 increases a degree of damping of the exterior part 3 in a first temperature range of the exterior part 3 and/or in a first frequency range of the oscillations. The second damping element 8 increases the degree of damping of the exterior part 3 in a second temperature range of the exterior part 3, which second temperature range is different from the first temperature range, and/or a second frequency range of the oscillations, which second frequency range is different from the first frequency range. The first damping element 7 and the exterior part 3 therefore form a first oscillatory system with a first degree of damping, and the second damping element 8 and the exterior part 3 form a second oscillatory system with a second degree of damping. Here, the first degree of damping is higher in the first temperature range and/or the first frequency range than the second degree of damping. The second degree of damping is higher in the second temperature range and/or the second frequency range than the first degree of damping. Therefore, oscillations in a particularly high overall temperature range, for example between −40° Celsius and +120° Celsius, and/or in a particularly high overall frequency range which comprises, in particular, oscillations in the ultrasonic range can be damped by way of the damping elements 7, 8. The first damping element 7 can be designed, for example, to damp oscillations at low temperatures of the exterior part 3, in particular, whereas the second damping element 8 is designed to damp oscillations at high temperatures of the exterior part 3, in particular.

Figure 2:
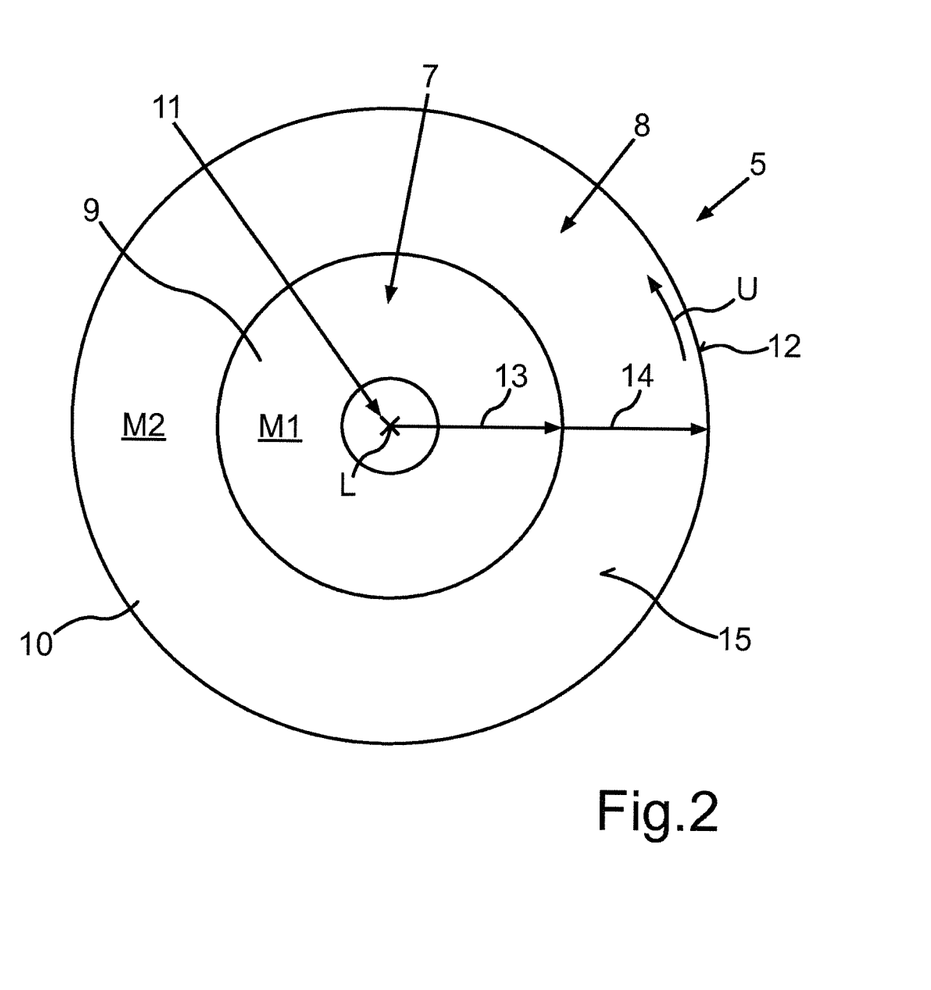
FIG. 2 shows a diagrammatic illustration of one embodiment of a damping device according to the invention in a plan view.

FIG. 2 shows one embodiment of a damping device 5 according to the invention in a plan view. Here, the damping device 5 is of plate-shaped configuration and comprises two separate regions 9, 10 as the damping elements 7, 8. Here, a longitudinal axis L of the damping device 5 runs into the plane of the drawing. Here, a cut-out 11 is provided centrally in the plate-shaped damping device 5, in which cut-out 11 the ultrasonic sensor 4 can be arranged. Here, the ultrasonic sensor 4 is arranged in such a way that the ultrasonic sensor 4 emits the ultrasonic signals in a transmitting direction parallel to the longitudinal axis L and/or receives the said ultrasonic signals counter to the transmitting direction parallel to the longitudinal axis L.

Here, the plate-shaped damping device 5 has a circular outer edge 12 which runs along a circumferential direction U. Moreover, the plate-shaped damping device 5 has a concentric construction. This means that the regions 9, 10 are of annular configuration. Here, the first region 9 is configured so as to adjoin the cut-out 11 and surrounds the cut-out 11 completely. An outer boundary of the first region 9 is at a first spacing 13 from the longitudinal axis L. The second region 10 is configured so as to adjoin the first region 9 and surrounds the first region 9 completely. The second region 10 extends from the first spacing 13 as far as a second spacing 14 from the longitudinal axis L. Here, an outer boundary of the second region 10 corresponds to the outer edge 12 of the plate-shaped damping device 5.

Here, the first damping element 7 which is configured by way of the first region 9 comprises a first material M1 with a first viscoelastic material property. The second damping element 8 which is configured by way of the second region 10 comprises a second material M2 with a second viscoelastic material property. The viscoelastic properties can be, for example, a dynamic modulus of elasticity or loss factor. The first material M1 or the first viscoelastic material property is optimized for the first temperature range and/or the first frequency range and can comprise, for example, bitumen. The second material M2 or the second viscoelastic material property is optimized for the second temperature range and/or the second frequency range and can comprise, for example, butyl rubber.

A surface 15 of the plate-shaped damping device 5 can have an adhesive layer, by means of which the damping device 5 can be connected to the rear side of the exterior part 3. The plate-shaped damping device 5 can also be configured as a self-adhesive film and can be, in particular, deformable or flexible, with the result that the surface 15 of the plate-shaped damping device 5 can be arranged so as to bear over the full surface area against the rear side of the exterior part 3.

Figure 3:
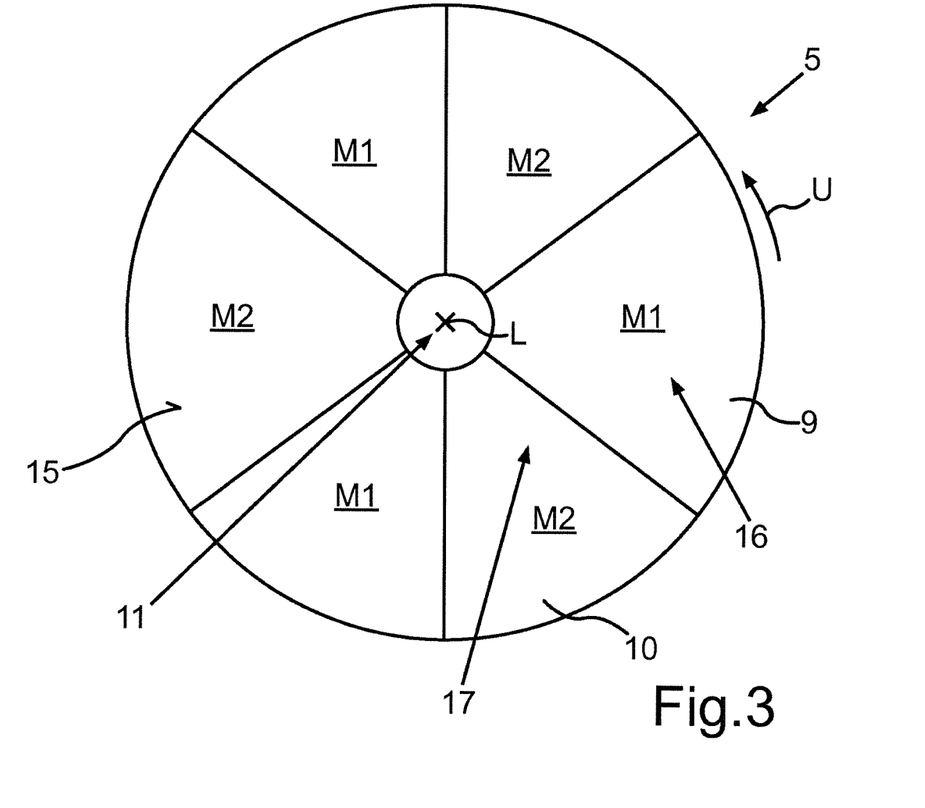
FIG. 3 shows a diagrammatic illustration of a further embodiment of a damping device according to the invention in a plan view.

FIG. 3 shows a further embodiment of the damping device 5 according to the invention in a plan view. Here, the plate-shaped damping device 5 is divided into segments 16, 17 along the circumferential direction U which runs about the longitudinal axis L. Here, the regions 9, 10 are therefore configured as cake piece-shaped segments 16, 17 which are configured so as to adjoin one another along the circumferential direction U. Here, the first segments 16 comprise the first material M1, and the second segments 17 comprise the second material M2. In other words, the segments 16, 17 comprise the first material M1 and the second material M2 in an alternating manner.

Figure 4:
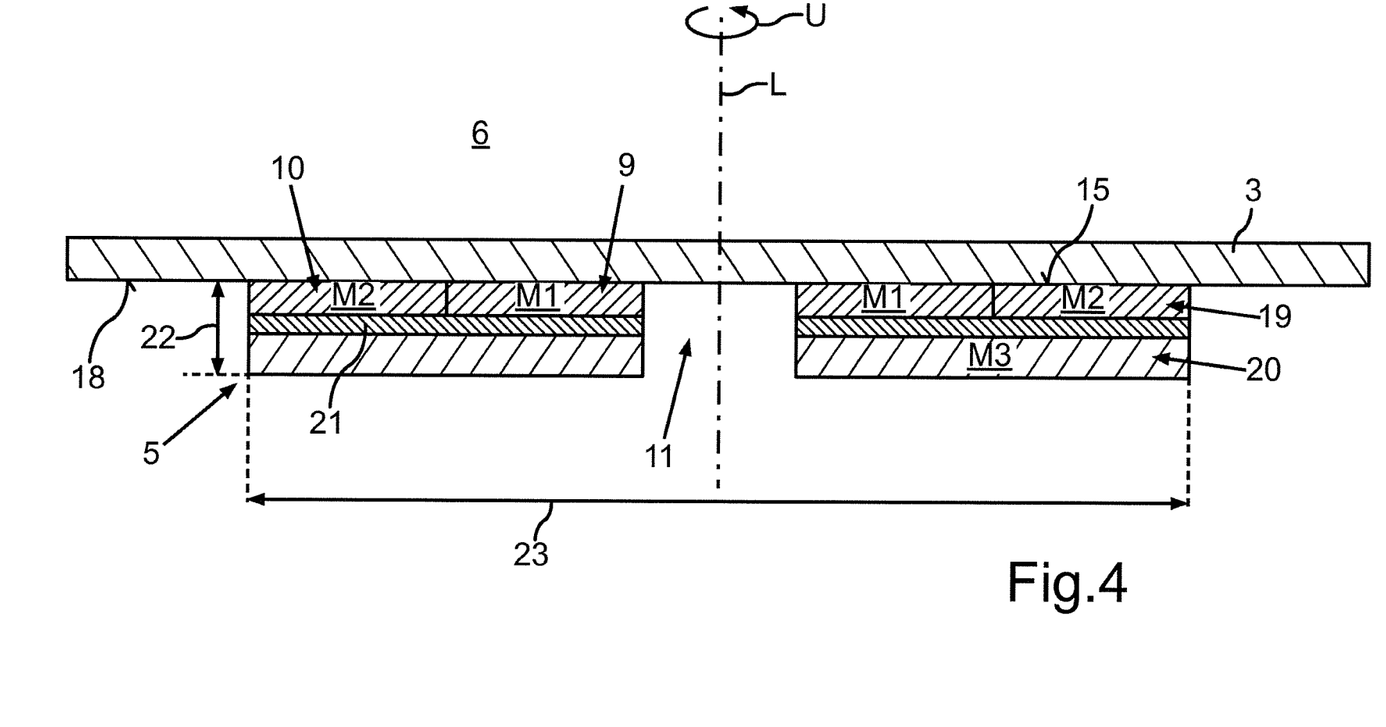
FIG. 4 shows a diagrammatic illustration of a further embodiment of a damping device according to the invention in a sectional view from the side.

FIG. 4 shows a further embodiment of the damping device 5 according to the invention in a sectional view from the side. It can be seen here that the damping device 5 is attached on the rear side 18 of the exterior part 3 or the vehicle exterior skin, which rear side 18 faces away from the surrounding region 6 of the motor vehicle 1. The ultrasonic sensor 4 can be arranged in the cut-out 11 which extends centrally in the plate-shaped damping device 5 along the longitudinal axis L, with the result that the surface 15 of the damping device 5 and an upper side of the ultrasonic sensor 4 are arranged, in particular, in a flush manner and can be arranged so as to bear against the rear side 18 of the exterior part 3. The upper side of the ultrasonic sensor 4 can be configured, for example, by way of a front side of an oscillatory diaphragm of the ultrasonic sensor 4.

Here, the damping device 5 has a layered construction along the longitudinal axis L, which layered construction comprises a first layer 19 and a second layer 20 here. Here, the first layer 19 in turn has the concentric construction which comprises the two regions 9, 10 with the two different materials M1, M2. The second layer 20 comprises a third material M3 which configures a third damping element and increases a degree of damping of the exterior part 3 in a third temperature range of the exterior part 3 and/or a third frequency range of the oscillations. It can also be provided, however, that the first layer 19 has at least two regions in a manner which comprises the segmented construction, and/or that the second layer 20 has at least two regions in a manner which comprises the segmented or concentric construction. Here, moreover, the damping device 5 comprises a stabilizing layer or a reinforcing layer 21 which is configured, together with the damping elements, to absorb shear forces in order to damp the oscillations in the exterior part 3. The reinforcing layer 21 can be formed, for example, from aluminium.

Along the longitudinal axis L, the plate-shaped damping device 5 has a thickness 22 which is, in particular, at most 1 mm. Moreover, a diameter 23 of the plate-shaped damping device 5 in a plane perpendicular with respect to the longitudinal axis L is, for example, at most 20 cm, in particular at most 10 cm. Here, the plate-shaped damping device 5 is therefore to be understood to mean a damping device, the thickness 22 of which is considerably smaller than its diameter 23.

Figure 5:
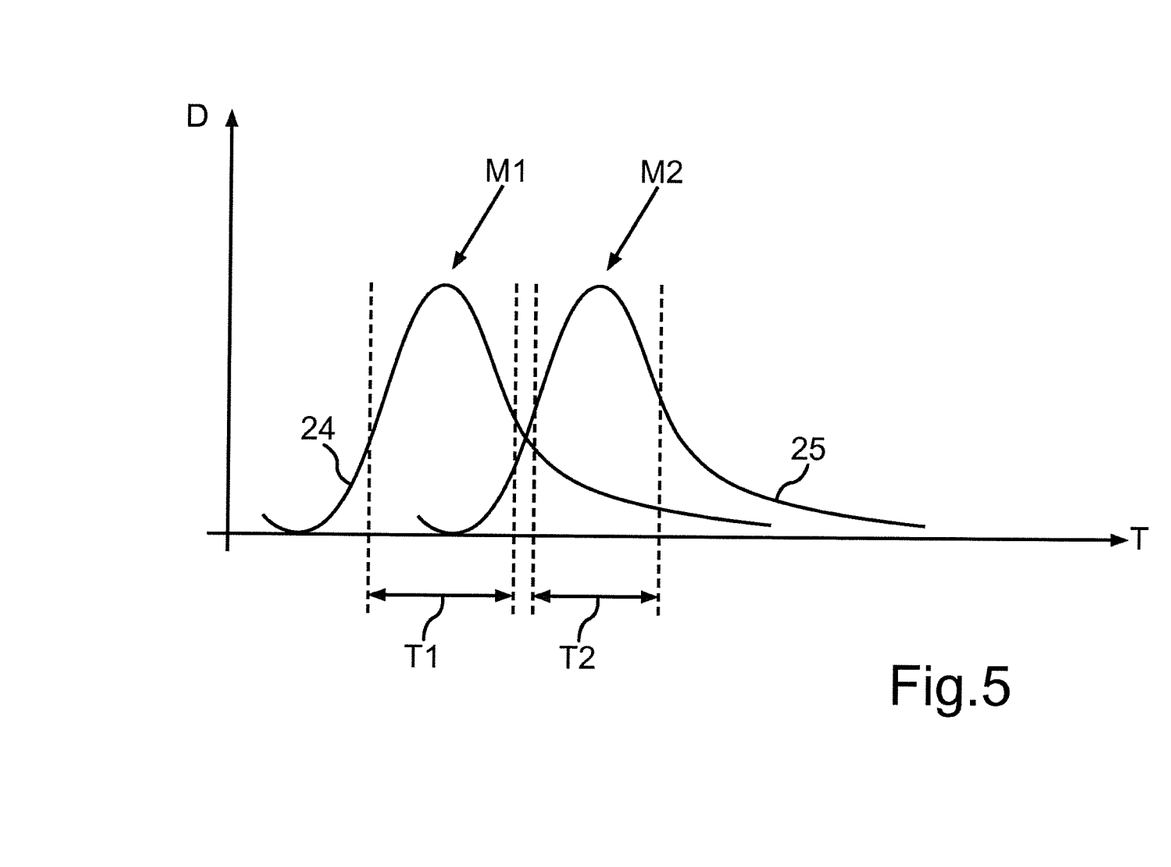
FIG. 5 shows a diagrammatic illustration of two characteristic curves which show respective material-specific damping behaviours.

FIG. 5 shows two characteristic curves 24, 25 which show the dependence of a damping capability D of the two materials M1, M2 on the temperature T. Here, the temperature T is plotted on the abscissa, and the damping capability D of the materials M1, M2 is plotted on the ordinate. It is shown using a first characteristic curve 24 which is assigned to the material M1 that the material M1 has a particularly high damping capability D in the first temperature range T1, since a maximum of the first characteristic curve 24 lies within the first temperature range T1. It is shown using a second characteristic curve 25 which is assigned to the material M2 that the material M2 has a particularly high damping capability D in the second temperature range T2, since a maximum of the second characteristic curve 25 lies within the second temperature range T2.

The invention claimed is:

1. A damping device for an exterior part of a motor vehicle for damping oscillations of the exterior part which are caused by way of an ultrasonic sensor during the emitting and/or receiving of ultrasonic signals, the damping device comprising:
    at least two damping elements different in viscoelasticity, including:
        a first damping element being configured for increasing a degree of damping of the exterior part in a first temperature range of the exterior part and/or in a first frequency range of the oscillations, and
        a second damping element being configured for increasing a degree of damping of the exterior part in a second temperature range of the exterior part and/or in a second frequency range of the oscillations, wherein the second temperature range is different from the first temperature range, and wherein the second frequency range is different from the first frequency range.

2. The damping device according to claim 1, wherein the first damping element comprises a first material, and the second damping element comprises a second material which is different from the first material.

3. The damping device according to claim 2, wherein the first damping element comprises bitumen as the first material, and the second damping element comprises butyl rubber as the second material.

4. The damping device according to claim 1, wherein the damping device has a continuous cut-out for arranging the ultrasonic sensor in the cut-out.

5. The damping device according to claim 1, wherein the damping device is of plate-shaped configuration, the first damping element being configured by way of a first region of the plate-shaped damping device, and the second damping element being configured by way of a second region of the plate-shaped damping device.

6. The damping device according to claim 5, wherein an outer edge of the plate-shaped damping device is of circular configuration, which outer edge runs about a longitudinal axis which lies perpendicularly on a surface of the damping device.

7. The damping device according to claim 5, wherein the plate-shaped damping device has a concentric construction, the first region being configured from a longitudinal axis of the damping device, which longitudinal axis lies perpendicularly on a surface of the plate-shaped damping device, as far as a first spacing from the longitudinal axis, and the second region being configured in a manner which adjoins the first region from the first spacing as far as a second spacing from the longitudinal axis.

8. The damping device according to claim 5, wherein the plate-shaped damping device has a layered construction and comprises at least two layers, the first region being configured by way of a first layer, and the second region being configured by way of a second layer which adjoins the first layer.

9. The damping device according to claim 5, wherein at the plate-shaped damping device has at least two segments which adjoin one another along a circumferential direction which runs about a longitudinal axis of the plate-shaped damping device, the first region being configured by way of a first segment, and the second region being configured by way of a second segment.

10. The damping device according to claim 5, wherein the plate-shaped damping device has a reinforcing layer, the at least two damping elements being arranged on the reinforcing layer.

11. The damping device according to claim 5, wherein the plate-shaped damping device has a thickness of at most 1 mm and/or a diameter of at most 10 cm.

12. The damping device according to claim 5, wherein the plate-shaped damping device has an adhesive layer on a surface of the damping device for attaching to a rear side of the exterior part, which rear side faces away from a surrounding region of the motor vehicle.

13. An arrangement for a motor vehicle comprising:
at least one ultrasonic sensor;
an exterior part of the motor vehicle; and
at least one damping device according to claim 1,
the at least one ultrasonic sensor and the at least one damping device being arranged on a rear side of the exterior part, wherein the rear side faces away from a surrounding region of the motor vehicle.

14. The arrangement according to claim 13, wherein the damping device is applied to the rear side of the exterior part by a spraying method and/or a metering method.

15. A motor vehicle having an arrangement according to claim 13.

* * * * *